United States Patent
Li et al.

(10) Patent No.: US 10,110,076 B2
(45) Date of Patent: Oct. 23, 2018

(54) SINGLE-PHASE BRUSHLESS MOTOR

(71) Applicant: Johnson Electric S.A., Murten (CH)

(72) Inventors: Yue Li, Hong Kong (CN); Bao Ting Liu, Shenzhen (CN); Chui You Zhou, Hong Kong (CN); Yong Wang, Shenzhen (CN); Ming Chen, Shenzhen (CN); Xiao Ning Zhu, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 858 days.

(21) Appl. No.: 14/455,160

(22) Filed: Aug. 8, 2014

(65) Prior Publication Data

US 2015/0042194 A1     Feb. 12, 2015

(30) Foreign Application Priority Data

Aug. 9, 2013 (CN) ............................ 2013 1 0347200
Aug. 9, 2013 (CN) ............................ 2013 1 0348173

(51) Int. Cl.
| | |
|---|---|
| *H02K 1/27* | (2006.01) |
| *H02K 1/16* | (2006.01) |
| *H02K 21/00* | (2006.01) |
| *H02K 21/16* | (2006.01) |
| *H02K 29/03* | (2006.01) |

(52) U.S. Cl.
CPC ............. *H02K 1/16* (2013.01); *H02K 1/2706* (2013.01); *H02K 21/00* (2013.01); *H02K 21/16* (2013.01); *H02K 29/03* (2013.01); *H02K 2201/03* (2013.01)

(58) Field of Classification Search
CPC ...... H02K 21/16; H02K 1/146; H02K 1/2706; H02K 3/18; H02K 15/22; H02K 5/225; H02K 2213/03; H02K 5/20; H02K 3/345; H02K 1/2786; H02K 1/187; H02K 21/22
USPC .................. 310/185, 216.102, 67 R, 216.053
See application file for complete search history.

(56) References Cited

U.S. PATENT DOCUMENTS

| | | | |
|---|---|---|---|
| 3,056,896 A | * | 10/1962 | Ludemann ............. H02K 17/04 |
| | | | 310/185 |
| 4,565,955 A | | 1/1986 | Kubota |
| 4,600,864 A | | 7/1986 | Sato |
| 4,730,136 A | | 3/1988 | Muller |

(Continued)

FOREIGN PATENT DOCUMENTS

| | | |
|---|---|---|
| CN | 1901335 | 1/2007 |
| JP | S63174531 | 7/1988 |

*Primary Examiner* — Joshua Benitez Rosario
*Assistant Examiner* — Leda Pham
(74) *Attorney, Agent, or Firm* — Muncy, Geissler, Olds & Lowe, P.C.

(57) ABSTRACT

A single-phase brushless motor includes a stator and a rotor rotatable with respect to the stator. The rotor includes a number of permanent magnetic poles. The stator includes a stator core and a winding wound on the stator core. The stator core includes an outer annular portion, an inner annular portion, and connecting portions connecting the inner and outer annular portions. The winding is wound around the connecting portions. The rotor is received in the inner annular portion. The inner annular portion and the rotor form a substantially uniform air gap. A recess is formed in an inner surface of a part of the inner annular portion between each pair of adjacent connecting portions. A center of each recess deviates from a center line of symmetry of the corresponding pair of connecting portions.

19 Claims, 8 Drawing Sheets

(56) References Cited

U.S. PATENT DOCUMENTS

| | | | |
|---|---|---|---|
| 5,170,083 A | 12/1992 | Burgbacher | |
| 6,304,018 B1 * | 10/2001 | Ham | H02K 1/12 |
| | | | 310/216.048 |
| 6,548,922 B1 * | 4/2003 | Takahashi | G04C 13/11 |
| | | | 310/49.33 |
| 7,560,844 B2 * | 7/2009 | Miyashita | H02K 29/03 |
| | | | 310/216.092 |
| 8,786,157 B2 * | 7/2014 | Brown | H02K 1/148 |
| | | | 310/216.024 |
| 2003/0234593 A1 * | 12/2003 | Baumeister | H02K 1/187 |
| | | | 310/216.011 |
| 2007/0290567 A1 * | 12/2007 | Adaniya | H02K 1/148 |
| | | | 310/216.004 |

* cited by examiner

SINGLE-PHASE BRUSHLESS MOTOR

CROSS REFERENCE TO RELATED APPLICATIONS

This non-provisional patent application claims priority under 35 U.S.C. § 119(a) from Patent Application No. 201310348173.8 filed in The People's Republic of China on Aug. 9, 2013 and Patent Application No. 201310347200.X filed in The People's Republic of China on Aug. 9, 2013, the entire contents of which are hereby incorporated by reference.

FIELD OF THE INVENTION

This invention relates to a single phase brushless motor and in particular, to a single phase brushless motor having a substantially uniform air gap.

BACKGROUND OF THE INVENTION

Figure 8:
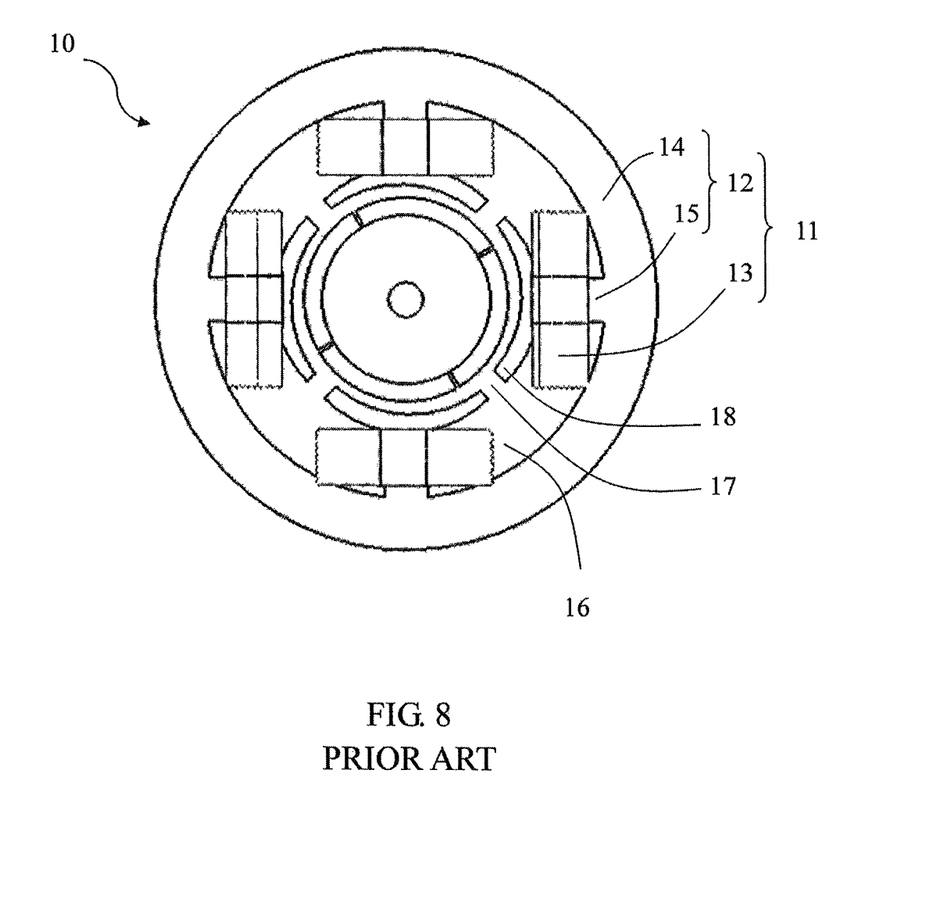
FIG. 8 is a plan view of a conventional single-phase brushless motor.

FIG. 8 shows a conventional single-phase brushless motor 10 which comprises a stator 11 and a rotor 19 installed in the stator. The stator comprises a stator core 12 and a winding 13 wound on the stator core. The stator core comprises an annular yoke 14 and a plurality of teeth 15 extending inwardly from the yoke. Slots 16 are formed between adjacent teeth for receiving coils of the winding 13. The yoke 14 and the teeth 15 of the stator core are integrally formed into a single integral structure. Each tooth 15 forms a stator pole which comprises a pole shoe 18 formed at the end of the tooth. The pole shoe extends along the circumferential direction of the motor. A slot opening 17 is formed between each pole shoe to allow access for winding a coil about each tooth. Therefore, a non-uniform air gap is formed between the stator 11 and the rotor 19. In the above conventional single-phase brushless motor, the presence of the slot openings 17 may cause the motor to generate an unduly large cogging torque, thereby causing vibrations and noises. Furthermore, as the stator core is of an integral structure, a reciprocating shuttle winding machine is required for the winding process, which causes a low winding efficiency.

SUMMARY OF THE INVENTION

Thus there is a desire for a new single-phase brushless motor, which has an improved reliability of the motor startup.

Accordingly, in a first aspect thereof, the present invention provides a single-phase brushless motor comprising a stator and a rotor rotatable with respect to the stator, the rotor comprising a rotor core having a plurality of permanent magnetic poles, the stator comprising a stator core and a winding wound on the stator core, the stator core comprising an outer annular portion, an inner annular portion, and a plurality of connecting portions connecting the inner annular portion to the outer annular portion, the winding being wound around the connecting portions, the rotor being received in the inner annular portion; wherein the inner annular portion of the stator and the rotor form a substantially uniform air gap therebetween, an inner surface, which faces the rotor, of a part of the inner annular portion between every two adjacent ones of the connecting portions is formed with a recess, and a center of each recess is offset from a middle line between corresponding two adjacent ones of the connecting portions.

Preferably, the inner surface of the inner annular portion is located on a circle concentric with the rotor.

Preferably, a magnetic bridge is formed at the part of the inner annular portion between every two adjacent ones of the connecting portions.

Preferably, the magnetic bridge comprises a groove formed in an outer surface of the inner annular portion.

Preferably, the magnetic bridge comprises an aperture or hole formed in the inner annular portion.

Preferably, the number of recesses is equal to the number of connecting portions and equal to the number of magnetic poles of the rotor.

Preferably, the connecting portions are separately formed with respect to one or both of the inner annular portion and the outer annular portion.

Preferably, the recesses run through the inner surface of the inner annular portion along an axial direction of the motor.

Preferably, the recesses are spacingly disposed in the inner surface of the inner annular portion along an axial direction of the motor.

Preferably, the motor has a start up angle which is in a range of 60 to 80 degrees electrical angle.

According to a second aspect, the present invention provides a single-phase brushless motor comprising: a stator comprising a stator core and a winding wound on the stator core, the stator core comprising an outer annular portion, an inner annular portion, and a plurality of connecting portions connected between the inner annular portion and the outer annular portion, the winding being wound around the connecting portions; and a rotor being received in the inner annular portion and rotatable with respect to the stator, the rotor comprising a plurality of permanent magnetic poles, wherein the rotor and the inner annular portion of the stator form a substantially uniform air gap therebetween, an inner surface, which faces the rotor, of a part of the inner annular portion between every two adjacent connecting portions is formed with a recess, and the recess is configured and arranged such that the rotor is capable of being started in two directions.

Preferably, a center of each recess is offset from a middle line between corresponding two adjacent connecting portions.

Preferably, an offset angle formed between the center of each recess and the middle line between corresponding two adjacent connecting portions is in a range of 45 to 135 degrees electrical angle.

Preferably, the inner surface of the inner annular portion is located on a circle concentric with the rotor.

Preferably, a magnetic bridge is formed in the part of the inner annular portion between every two adjacent connecting portions.

Preferably, the magnetic bridge comprises a groove formed in an outer surface of the inner annular portion.

Preferably, the magnetic bridge comprises an aperture or hole formed in the inner annular portion.

Preferably, the number of recesses is equal to the number of connecting portions and equal to the number of magnetic poles of the rotor.

Preferably, the connecting portions are separately formed with respect to one or both of the inner annular portion and the outer annular portion.

Preferably, the rotor further comprises a rotor core and the plurality of permanent magnetic poles is formed by one or more permanent magnets mounted on a radially outer surface of the rotor core.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
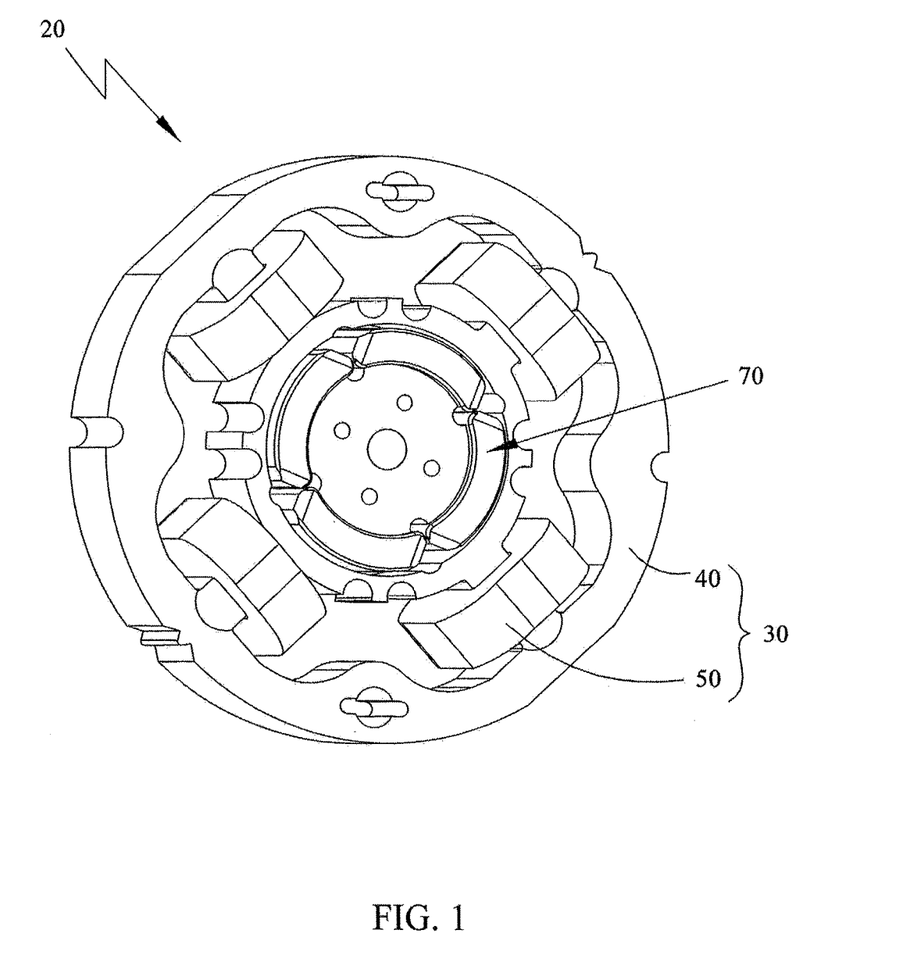
FIG. 1 is a perspective view of a single-phase brushless motor in accordance with a preferred embodiment of the present invention.
Figure 2:
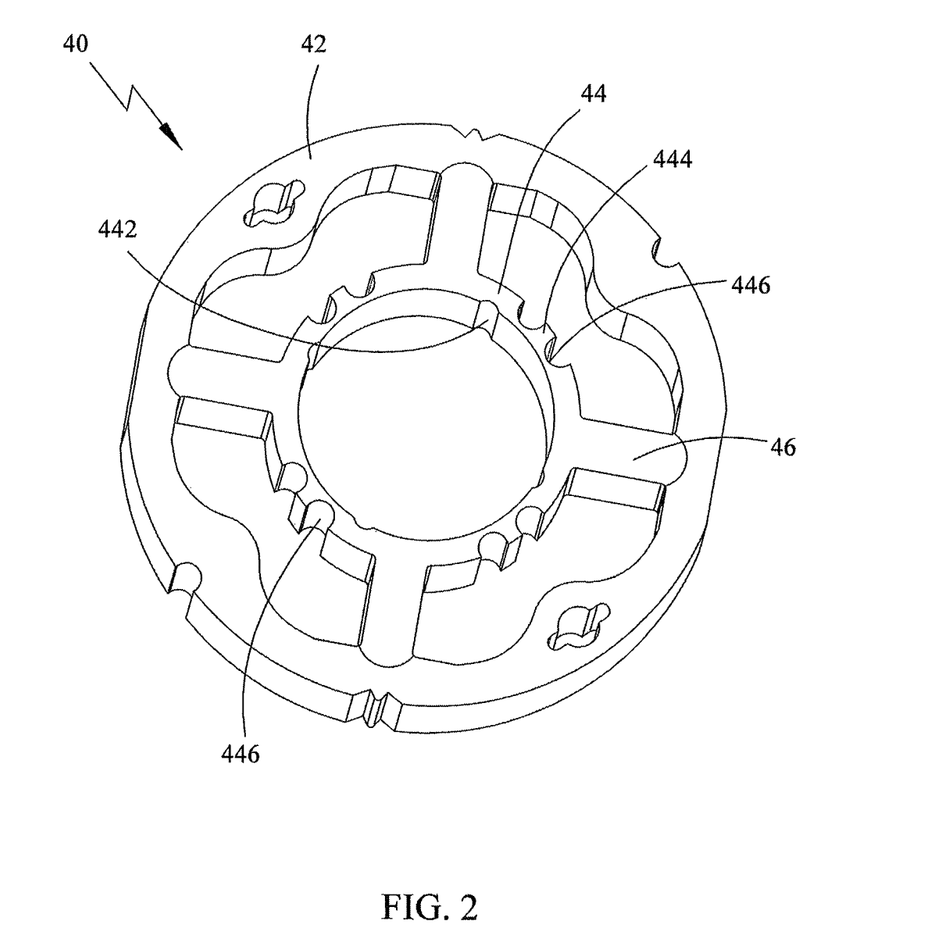
FIG. 2 is a perspective view of a stator core of the single-phase brushless motor of FIG. 1.
Figure 3:
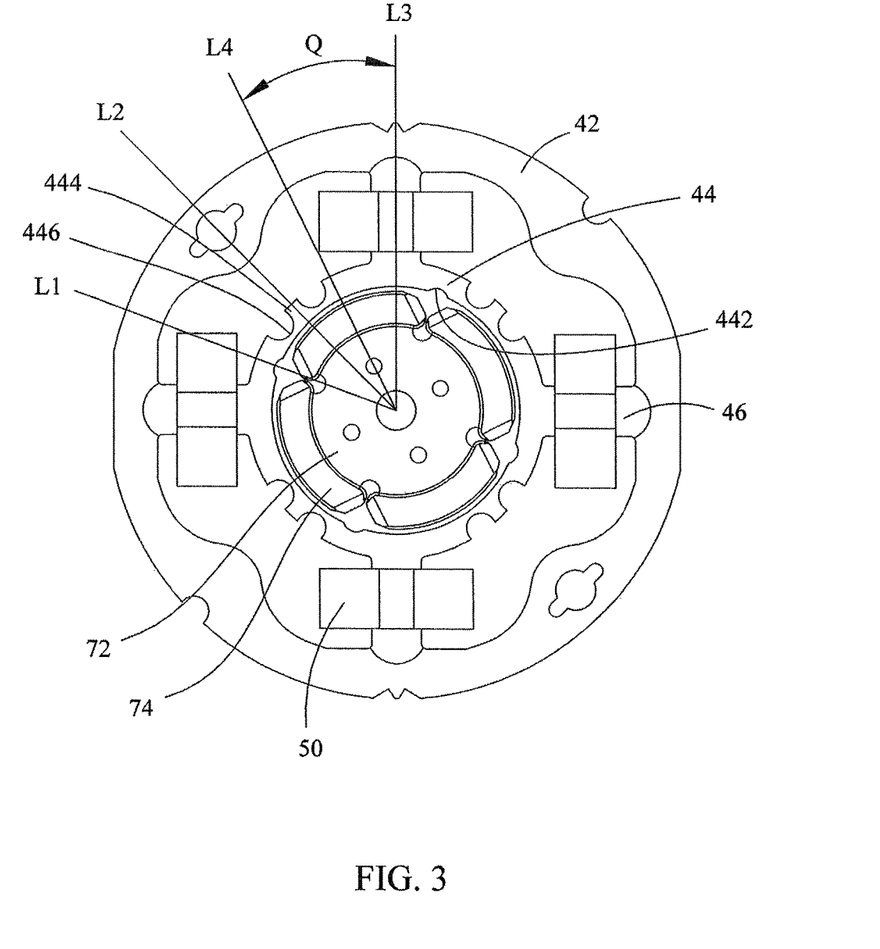
FIG. 3 is a plan view of the single-phase brushless motor of FIG. 1.

Referring to FIG. 1 through FIG. 3, a single phase brushless motor 20 in accordance with a first preferred embodiment of the present invention includes a stator 30 and a rotor 70 rotatably mount with respect to the stator 30.

The stator 30 includes a stator core 40 and a winding 50 wound on the stator core 40. The stator core 40 is made of a magnetically conductive material. For example, the stator core 40 is formed by a plurality of magnetically conductive laminations such as silicon steel sheets stacked in an axial direction of the motor. The stator core 40 includes an outer annular portion 42, an inner annular portion 44, and a plurality of connecting portions 46 connecting the inner annular portion 44 with the outer annular portion 42. As used herein, the term "annular portion" refers to an enclosed structure which extends continuously in a circumferential direction. Preferably, the connecting portions 46 are evenly spaced in a circumferential direction of the motor, and each connecting portion 46 extends substantially radially from the inner annular portion 44 to the outer annular portion 42. In the illustrated embodiment, the connecting portions 46 are integrally formed with the inner annular portion 44 to form an integral body. The connecting portions 46 and the outer annular portion 42 are separated structures, i.e. the outer annular portion 42 and the connecting portions 46 are separately formed and then assembled together. The winding 50 is wound around the connecting portions 46. The rotor 70 is received in the inner annular portion 44. A radially inner surface, which faces the rotor 70, of a part of the inner annular portion 44 between each two adjacent connecting portions 46 is formed with a recess 442. A center of the recess 442 is offset from a radial line midway between corresponding two adjacent connecting portions 46, herein referred to as the middle line. Preferably, the middle line is the center line of symmetry of the corresponding two adjacent connecting portions 46. That is, a straight line L1 passing through the center of the recess 442 and a center of the rotor 70 is at an angle to the center line of symmetry L2 of the corresponding two adjacent connecting portions 46, as shown in FIG. 3.

Preferably, the recess 442 extends through the inner surface of the inner annular portion 44 of the stator core 40 along the axial direction of the motor.

Figure 9:
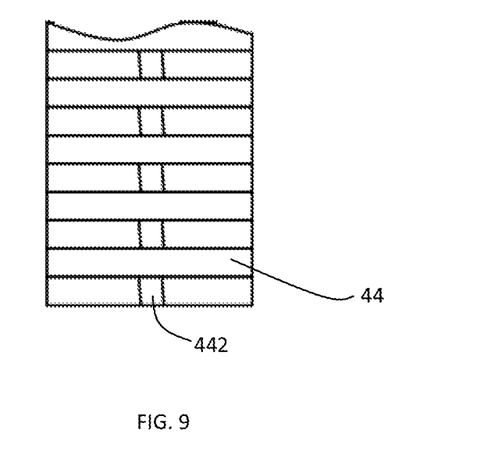
FIG. 9 is a side plan view of a part of the inner annular portion of the stator core of the single-phase brushless motor of FIG. 1, viewed from a radial direction of the inner annular portion of the stator core.

It is to be understood that the recesses 442 may also be spacingly disposed on the inner surface of the inner annular portion 44 of the state core along the axial direction of the motor. For example, the stator core 40 is formed by two types of laminations stacked in the axial direction of the motor in an alternating way and the recesses are formed on one type of laminations, as shown in FIG. 9.

Preferably, the inner surface of the inner annular portion 44 is located at a circle which is concentric with the rotor 70. As such, a substantially uniform air gap is formed between the stator and the rotor, i.e., between the inner surface of the inner annular portion 44 and an outer surface of the rotor 70.

Figure 4:
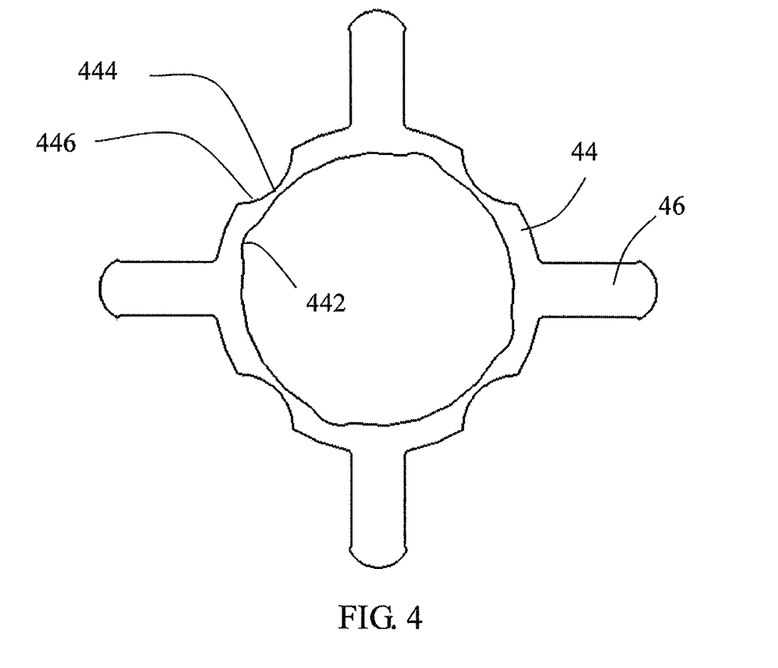
FIG. 4 and FIG. 5 illustrate different embodiments of a part of the stator core.
Figure 5:
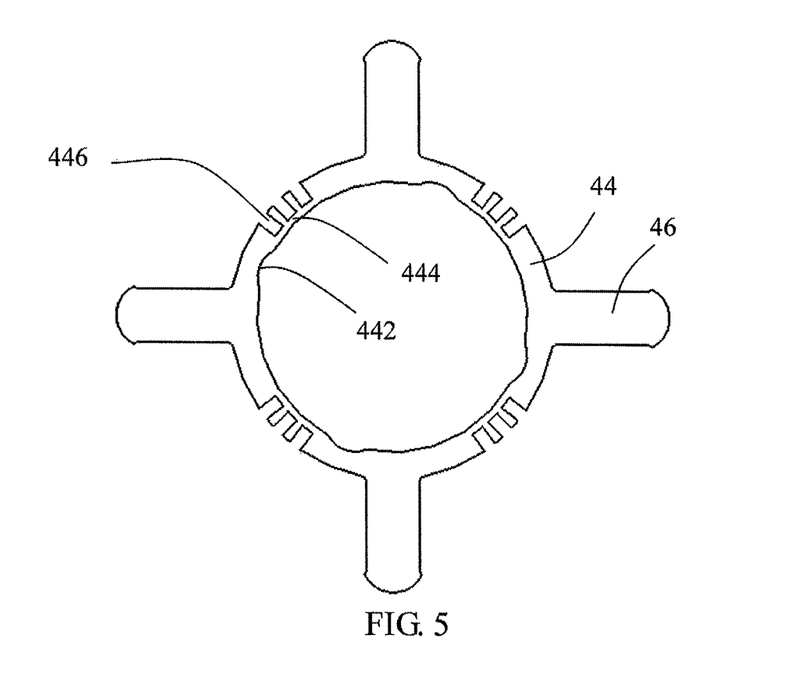

Preferably, magnetic bridges 444 are formed at parts of the inner annular portion 44 between adjacent connecting portions 46. Each magnetic bridge 444 comprises at least one portion the radial width of which is less than a radial width of other parts of the inner annular portion 44. Preferably, each magnetic bridge 444 comprises a plurality of grooves 446 formed in the outer surface of the inner annular portion 44. In the illustrated embodiment, each magnetic bridge 444 comprises a pair of grooves 446 formed in the outer surface of the inner annular portion 44. It is to be understood that the number of the grooves 446 may be one as shown in FIG. 4, three as shown in FIG. 5, or other numbers depending upon design requirements. The grooves 446 can be of various shapes such as arc shape as shown in FIGS. 3 and 4 or square shape as shown in FIG. 5.

Figure 6:
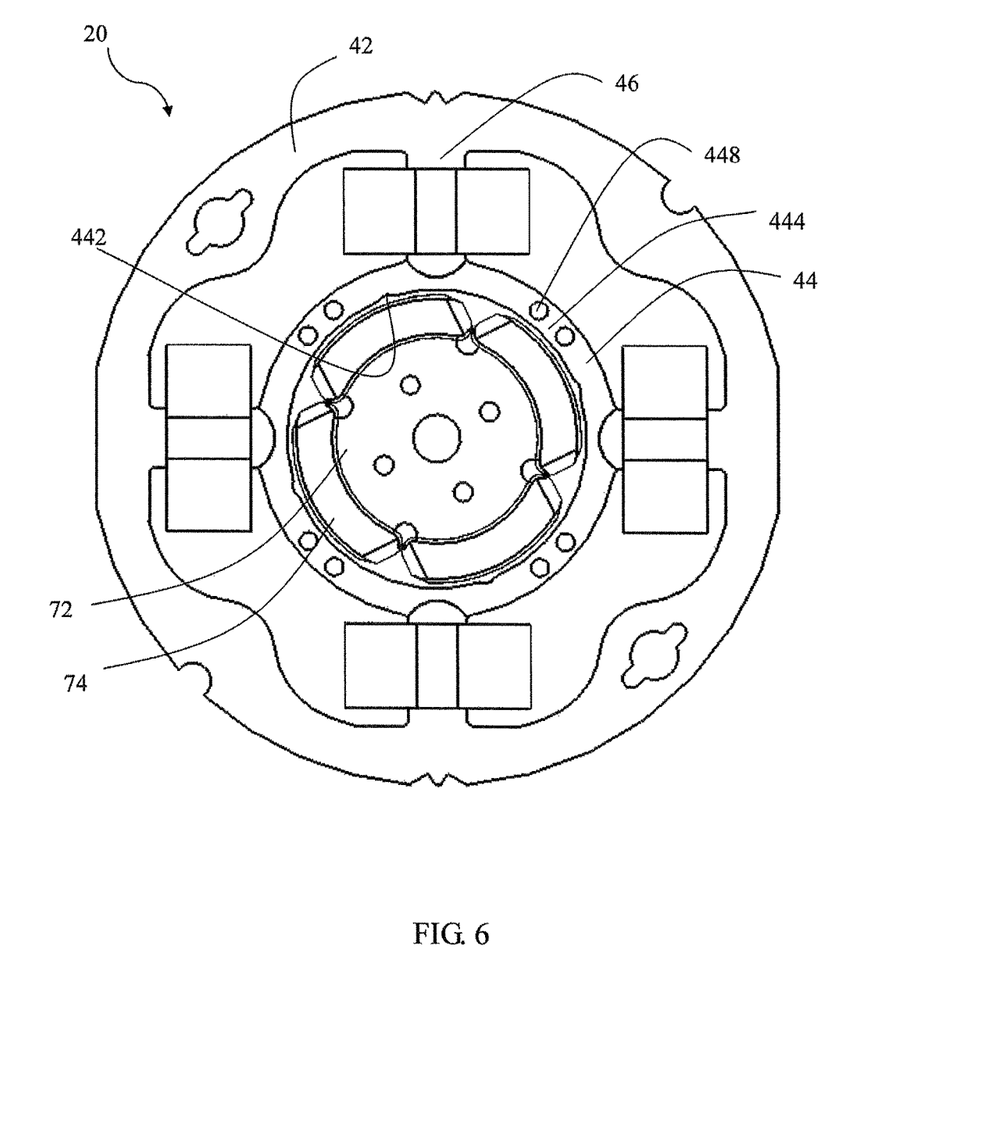
FIG. 6 is a plan view of a single-phase brushless motor in accordance with another embodiment of the present invention.

It is to be understood that, as shown in FIG. 6, the magnetic bridges 444 may also be formed by apertures/holes 448 in the inner annular portion 44.

It is also to be understood that each connecting portion 46 may be fixedly mounted to the outer annular portion 42 by welding or various mechanical connection means for example an interlocking structure with a wedge-shaped protrusion engaged in a wedge-shaped recess.

The winding 50 includes a plurality of coils each wound around a corresponding one of the connecting portions 46. As such, the number of the coils is equal to the number of the connecting portions 46. The coils may be connected to form a single-phase winding in various connecting manners. For example, all the coils may be connected in series; two coils connected in series may be connected in parallel with the other two coils connected in series; or all the coils may be connected in parallel.

It is also to be understood that, as shown in FIG. 6, the connecting portions 46 may also be integrally formed with the outer annular portion 42 and separately formed with respect to the inner annular portion 44. After all coils of the winding 50 are respectively wound around the connecting portions 46, the outer annular portion 42 and the connecting portions 46 with the coils wound thereon are then fixedly coupled to the inner annular portion 44.

Figure 7:
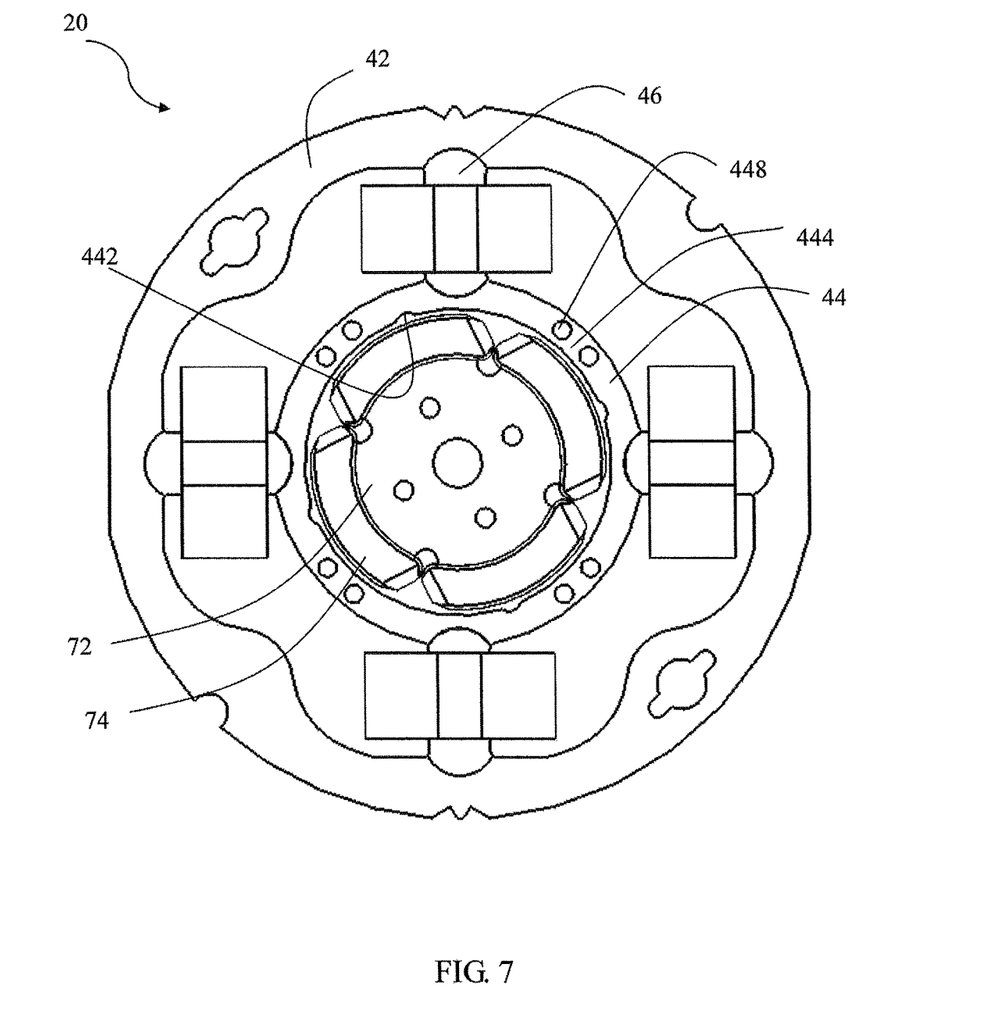
FIG. 7 is a plan view of a single-phase brushless motor in accordance with yet another embodiment of the present invention.

It is also to be understood that, as shown in FIG. 7, the connecting portions 46 may be separately formed with respect to both of the outer annular portion 42 and the inner annular portion 44. After all coils of the winding 50 are wound around the connecting portions 46, the connecting portions 46 are fixedly coupled to the outer annular portion 42 and the inner annular portion 44.

The rotor 70 includes a rotor core 72 and a permanent magnet 74 fixed on an outer surface of the rotor core 72. The permanent magnet 74 is formed with a plurality of circumferentially spaced permanent magnetic poles, adjacent magnetic poles having opposite polarities. Preferably, the number of magnetic poles formed by the permanent magnet 74 is equal to the number of connecting portions 46 of the stator and equal to the number of recesses 442 formed in the inner surface of the inner annular portion 44 of the stator core. In the illustrated embodiment, the rotor has four magnetic poles. It is to be understood that the rotor may have another number of permanent magnetic poles, such as, two, six, or eight permanent magnetic poles.

When the motor is not powered on, neutral zones between adjacent magnetic poles 74 of the rotor are aligned with the recesses 442 of the inner annular portion 44 of the stator, respectively. That is, a center line L4 of each rotor magnetic pole coincides with a center line of symmetry of corresponding adjacent two recesses 442, i.e. a radial line midway between adjacent recesses 442. Thus the center line L4 of each rotor magnetic pole is offset from a center line L3 of an adjacent one of the connecting portions 46 of the stator (also called stator pole portion). The offset angle formed between the center line L4 and the center line L3 is called the startup angle Q. The value of the startup angle Q is equal to the value of the angle formed between the radial lines L1 and L2. In the illustrated embodiment, the startup angle is greater than 45 degrees electrical angle but less than 135 degrees electrical angle. When the stator winding 50 of the motor is energized with a current in one direction, the rotor 70 can be easily rotated in one direction; when the stator winding 50 is energized with a current in an opposite direction, the rotor 70 can be rotated in the opposite direction. It is to be understood that when the startup angle Q is equal to a 90 degrees electrical angle, i.e., the center line of each rotor magnetic pole coincides with the center line of symmetry of adjacent connecting portions 46, the rotor 70 can be easily started in both directions, which is the best situation to achieve bi-directional startup of the motor. As the startup angle Q deviates from the 90 degrees electrical angle, startup of the rotor in one direction is easier than in the opposite direction. When the startup angle Q is in the range of 60 to 80 degree electrical angle, the rotor is capable of being started very easily in one direction. It is found that when the startup angle Q is in the range from 45 to 135 degrees electrical angle, the rotor has good startup reliability in both directions.

In the single-phase brushless motor described in the above embodiments, a substantially uniform air gap is formed between the stator and the rotor except portions of the air gap corresponding to the recesses 442 and the neutral zones between adjacent permanent magnetic poles 74. Therefore, the startup angle and cogging torque required for startup of the motor can be easily adjusted depending upon actual design requirements, thus enabling reliable startup of the motor. For example, the motor startup angle can be easily adjusted by adjusting the locations of the recesses 442 formed in the inner surface of the inner annular portion. When the startup angle Q is greater than the 45 degree but less than 135 degree electrical angle, the rotor can be reliably started in both directions. The cogging torque before the motor starts can be adjusted by adjusting the shape, size or depth of the recesses 442 in the inner annular portion. The inner annular portion 44 of the stator core is of a continuous structure, and parts of the inner annular portion between adjacent connecting portions are interconnected by the magnetic bridges, which avoids a sudden change in magnetic resistance due to slot openings defined between adjacent stator pole portions as in conventional motors, and thereby reduces the cogging torque of the motor. The stator core includes separate structures that are assembled together. Therefore, the coils of the winding can be wound on the connecting portions using a double fly winding machine prior to the assembly of the connecting portions and the outer annular portion or the inner annular portion, thus enhancing the efficiency the winding process.

It is to be understood that the stator core may be of an integral structure if the winding efficiency is not a key concern. That is, the connecting portions may be integrally formed with the inner and outer annular portions.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single-phase brushless motor comprising a stator and a rotor rotatable with respect to the stator, the rotor comprising a rotor core having a plurality of permanent magnetic poles, the stator comprising a stator core and a winding wound on the stator core, the stator core comprising an outer annular portion, an inner annular portion, and a plurality of stator pole portions connecting the inner annular portion to the outer annular portion, the winding being wound around the stator pole portions, the rotor being received in the inner annular portion;

wherein the inner annular portion of the stator and the rotor form a substantially uniform air gap therebetween, an inner surface, which faces the rotor, of a part of the inner annular portion between every two adjacent ones of the stator pole portions rather than in the stator pole portions is formed with a recess, and a center of each recess is offset from a middle line between corresponding two adjacent ones of the stator pole portions, and wherein, when the winding is not energized, a center line of each rotor permanent magnetic pole is offset from a center line of an adjacent one of the stator pole portions, in such a way as to enable the rotor start relative to the stator upon energizing the winding.

2. The single-phase brushless motor of claim 1, wherein the inner surface of the inner annular portion is located on a circle concentric with the rotor.

3. The single-phase brushless motor of claim 1, wherein a magnetic bridge is formed at the part of the inner annular portion between every two adjacent ones of the stator pole portions.

4. The single-phase brushless motor of claim 3, wherein the magnetic bridge comprises a groove formed in an outer surface of the inner annular portion.

5. The single-phase brushless motor of claim 3, wherein the magnetic bridge comprises an aperture or hole formed in the inner annular portion.

6. The single-phase brushless motor of claim 1, wherein a number of the recesses is equal to a number of the stator pole portions and equal to a number of the magnetic poles of the rotor, the recesses being uniformly spaced from each other in a circumferential direction of the inner annular portion.

7. The single-phase brushless motor of claim 1, wherein the stator pole portions are separately formed with respect to one or both of the inner annular portion and the outer annular portion.

8. The single-phase brushless motor of claim 1, wherein the recesses run through the inner surface of the inner annular portion along an axial direction of the motor.

9. The single-phase brushless motor of claim 1, wherein the recesses are spacingly disposed in the inner surface of the inner annular portion along an axial direction of the motor.

10. The single-phase brushless motor of claim 1, wherein the motor has a start up angle which is in a range of 60 to 80 degrees electrical angle.

11. A single-phase brushless motor comprising:
a stator comprising a stator core and a winding wound on the stator core, the stator core comprising an outer annular portion, an inner annular portion, and a plurality of stator pole portions connected between the inner annular portion and the outer annular portion, the winding being wound around the stator pole portions; and
a rotor being received in the inner annular portion and rotatable with respect to the stator, the rotor comprising a plurality of permanent magnetic poles,
wherein the rotor and the inner annular portion of the stator form a substantially uniform air gap therebetween, an inner surface, which faces the rotor, of a part of the inner annular portion between every two adjacent stator pole portions rather than in the stator pole portions is formed with a recess, a center of each recess is offset from a middle line between corresponding two adjacent stator pole portions which results in a center line of each rotor permanent magnetic pole offset from a center line of an adjacent one of the stator pole portions when the motor is not powered on, such that the rotor is capable of being started in two directions.

12. The single-phase brushless motor of claim 11, wherein an offset angle formed between the center of each recess and the middle line between corresponding two adjacent stator pole portions is in a range of 45 to 135 degrees electrical angle.

13. The single-phase brushless motor of claim 11, wherein the inner surface of the inner annular portion is located on a circle concentric with the rotor.

14. The single-phase brushless motor of claim 11, wherein a magnetic bridge is formed in the part of the inner annular portion between every two adjacent stator pole portions.

15. The single-phase brushless motor of claim 14, wherein the magnetic bridge comprises a groove formed in an outer surface of the inner annular portion.

16. The single-phase brushless motor of claim 14, wherein the magnetic bridge comprises an aperture or hole formed in the inner annular portion.

17. The single-phase brushless motor of claim 11, wherein a number of the recesses is equal to a number of the stator pole portions and equal to a number of magnetic poles of the rotor, the recesses being uniformly spaced from each other in a circumferential direction of the inner annular portion.

18. The single-phase brushless motor of claim 11, wherein the stator pole portions are separately formed with respect to one or both of the inner annular portion and the outer annular portion.

19. The single-phase brushless motor of claim 11, wherein the rotor further comprises a rotor core and the plurality of permanent magnetic poles is formed by one or more permanent magnets mounted on a radially outer surface of the rotor core.

* * * * *